United States Patent [19]

Wright et al.

[11] Patent Number: 5,410,446
[45] Date of Patent: Apr. 25, 1995

[54] CIRCUIT BREAKER EXPLOSION STRESS ABSORBER

[75] Inventors: William G. Wright, Liverpool; Nelson L. Lansing, Bridgeport, both of N.Y.

[73] Assignee: Cooper Industries, Inc., Houston, Tex.

[21] Appl. No.: 119,999

[22] Filed: Sep. 10, 1993

[51] Int. Cl.⁶ .......................................... H02B 13/00
[52] U.S. Cl. .................................... 361/652; 174/52.1; 200/301; 200/302.1; 361/810; 361/634
[58] Field of Search ................ 337/186; 220/367, 372, 220/436; 439/271, 276; 174/50, 50.5, 52.1; 200/302.1, 306, 293, 297, 301; 361/600, 605, 622, 627, 634, 641, 644, 652, 673, 679, 728, 807, 809, 810, 825

[56] References Cited

U.S. PATENT DOCUMENTS

| | | | |
|---|---|---|---|
| 2,756,369 | 7/1956 | Gorrie | 317/122 |
| 2,801,768 | 8/1957 | Immel | 220/88 |
| 3,177,323 | 4/1965 | Carter | 200/144 |
| 3,378,320 | 4/1968 | Morgan et al. | 312/108 |
| 3,724,706 | 4/1973 | Slocum | 220/3.8 |
| 3,936,704 | 2/1976 | Brenneman | 317/118 |
| 3,996,604 | 12/1976 | Kimura | 357/82 |
| 4,271,343 | 6/1981 | Danchin | 200/304 |
| 4,424,427 | 7/1982 | Gebel et al. | 200/144 |
| 4,783,718 | 11/1988 | Raabe | 361/363 |
| 4,796,159 | 1/1989 | Miksche | 361/429 |
| 4,821,144 | 4/1989 | Grass | 361/353 |
| 5,157,366 | 10/1992 | Mullins | 361/634 |
| 5,172,300 | 12/1992 | Morby | 361/355 |
| 5,224,918 | 7/1993 | Neumann | 29/885 |
| 5,304,761 | 4/1994 | Rosen | 200/144 R |

Primary Examiner—Gerald P. Tolin
Attorney, Agent, or Firm—Conley, Rose & Tayon

[57] ABSTRACT

An explosion absorbing apparatus for use with circuit breakers mounted in an explosion-proof panelboard enclosure includes force absorbing plates and rods for attaching the plates to the side panels of circuit breakers. The fastener members draw the force absorbing plates together against the side panels of the circuit breakers to absorb the stress generated by an explosion inside the panelboard enclosure. This apparatus ensures the integrity of circuit breakers contained within a panelboard enclosure during an explosion. The force absorbing plates eliminate catastrophic destruction of the circuit breakers and reduce the cumulative explosion pressure in the panelboard enclosure.

37 Claims, 3 Drawing Sheets

CIRCUIT BREAKER EXPLOSION STRESS ABSORBER

BACKGROUND OF THE INVENTION

This invention relates to circuit breaker panelboard enclosures and more particularly, to explosion-proof enclosures preventing the destruction of the circuit breakers contained within the enclosure during an explosion. Still more particularly, the invention relates to stress absorbing members which absorb the stress exerted on the circuit breakers by the explosion.

Explosion-proof panelboard enclosures are required in hazardous Class I (gaseous) environments to contain any explosion originating in a panelboard enclosure and reduce the risk of the explosion spreading to the surrounding environment. The purpose of the explosion-proof panelboard enclosure is to minimize the hazards of electrical arcing in areas where such arcs can cause an explosion. Therefore, a conventional explosion-proof panelboard enclosure typically consists of a cast metal box designed to contain explosions caused by the ignition of combustible gases which permeate inside the enclosure.

The circuit breakers are enclosed in the explosion-proof panelboard. Circuit breakers inherently by their operation create electrical arcing when they are triggered during high voltage operation. Circuit breakers typically contain at least one normally closed electrical contact. The circuit breaker opens the electrical contacts to protect high voltage circuitry and equipment from either power surges or electrical shorts. When the contacts begin to physically separate, the high voltage potential across the contacts arcs from one contact to the other. Arcing will continue until the physical distance between the contacts is sufficient to prohibit arcing.

Explosion proof panelboard enclosures are designed to prohibit an explosion from propagating outside the enclosure. This is accomplished by eliminating all potential flamepaths from inside the panelboard enclosure to the outside surrounding environment. Panelboard enclosures are not, however, sealed to prevent gases from permeating inside the enclosure. Thus, when combustible gas is present inside the panelboard and a circuit breaker is triggered, electrical arcing may ignite the gas. During the resultant explosion, the ignited gas sends a gas pressure wave through the interior of the panelboard enclosure pressure piling the gas inside the housing of the circuit breakers disposed within the enclosure. This pressure piling, especially with Group B gas, creates a high pressure explosion inside the circuit breaker housing and subsequently blows up the breaker.

Testing of panelboard enclosures is governed by National Electric Code (N.E.C.) classifications for areas where the use of electrical equipment can cause ambient gas to explode. In its simplest form, testing a panelboard typically consists of filling the enclosure with a combustible gas, such as a mixture of hydrogen and air, and igniting the gas with an ignition device installed in the panelboard. The resulting explosion must be contained within the enclosure so that flames do not propagate outside the enclosure, thus setting off a greater explosion. Further, the enclosure must be strong enough to withstand the explosion without breaching and the temperature of the panelboard after an explosion can not exceed a specified percentage of the explosion temperature of the gas under test, typically 80 percent. The specification for the minimum acceptable panelboard strength for a new panelboard design is calculated by multiplying the hydrostatic pressure measured during initial testing by a value pre-determined by Underwriters Laboratory, typically four (4). This strength specification dictates the type of materials that must be used to construct the panelboard and establishes the design parameters necessary to insure containment of explosions in hazardous areas.

Current panelboard explosions result in the destruction of the circuit breakers contained therein. This destruction is believed to be the result of the ignition of gas which both permeated into the circuit breaker housing and was forced into the housing by pressure piling.

When hydrogen is ignited in an enclosed chamber, a compressive wave front is created. This wave front originates at the point of ignition and propagates through the chamber proceeding the explosion. The wave front compresses the hydrogen in front of the wave, thereby increasing the density and explosive force of the hydrogen. It is believed that when the wave front reaches a circuit breaker it piles, or forces, highly compressed gas inside of the circuit breaker housing so that the gas inside the housing becomes very dense. When the explosion reaches the circuit breaker, the dense gas inside the housing ignites. The explosion of this highly dense gas in the relatively small area of a circuit breaker housing, results in a high pressure explosion which breaches the circuit breaker housing.

When the housing of the circuit breaker is ruptured, the higher circuit breaker explosion pressure is translated to the panelboard enclosure. Further, in an application where there is a plurality of circuit breakers in a row, the explosive wave front travels from one circuit breaker to the next; destroying each component. Explosions in a panelboard enclosure containing one or more circuit breakers result in an explosion pressure three (3) times higher than an identical explosion in an empty enclosure. Therefore, the destruction of a single component increases the cumulative explosion pressure in the panelboard enclosure, increasing the necessary strength specifications for the panelboard enclosure.

It is important that the circuit breakers contained within the panelboard enclosure maintain their integrity and continue to function after an explosion. The present invention overcomes the deficiencies of prior art enclosures by ensuring the integrity of the circuit breakers during an explosion.

SUMMARY OF THE INVENTION

The present invention includes force absorbing plates mounted on the side panels of the end circuit breakers in an explosion-proof panelboard enclosure. Fastener members draw the circuit members together to better absorb the force generated by an explosion inside the panelboard enclosure. The force absorbing plates eliminate catastrophic destruction of the circuit breakers and reduce the cumulative explosion pressure in the panelboard enclosure. Each force absorbing plate consists of a substantially flat plate having a plurality of fastener members for compressing an individual circuit breaker, or plurality of circuit breakers, together. Fastening members include a plurality of threaded rods and nuts attached to the plates.

The plates absorb the stresses resulting from the forces caused by the pressure wave of the explosion of gas as the wave passes through the chamber of the enclosure. The invention insures that the integrity of the circuit breaker components are maintained throughout explosions. Because the high pressure explosion of circuit breakers is minimized or eliminated, the explosion pressure inside the panelboard enclosure is significantly reduced. Without the invention, the housings of the circuit breakers catastrophically rupture and the panelboard cumulative explosion pressure increases. Use of the explosion absorbing structure results in panelboard enclosures which are less expensive to manufacture, and yet still meet N.E.C. and Underwriters Laboratory specifications.

Other objects and advantages of the invention will appear from the following description.

BRIEF DESCRIPTION OF THE DRAWINGS

For a detailed description of the preferred embodiment of the invention, reference will now be made to the accompanying drawings wherein.

DETAILED DESCRIPTION OF A PREFERRED EMBODIMENT

The apparatus of the present invention includes force absorbing plates which contain clamping holes receiving the terminal ends of absorbing rods. The force absorbing plates are compressionally attached to one or more standard circuit breakers by threading nuts on the ends of the absorbing rods which project through the holes of the force absorbing plates. The circuit breakers, with the apparatus of the present invention mounted thereon, are isolated from hazardous environments by housing them in a conventional explosion-proof panelboard enclosure to prevent explosions during the operation of the circuit breakers.

Figure 1:
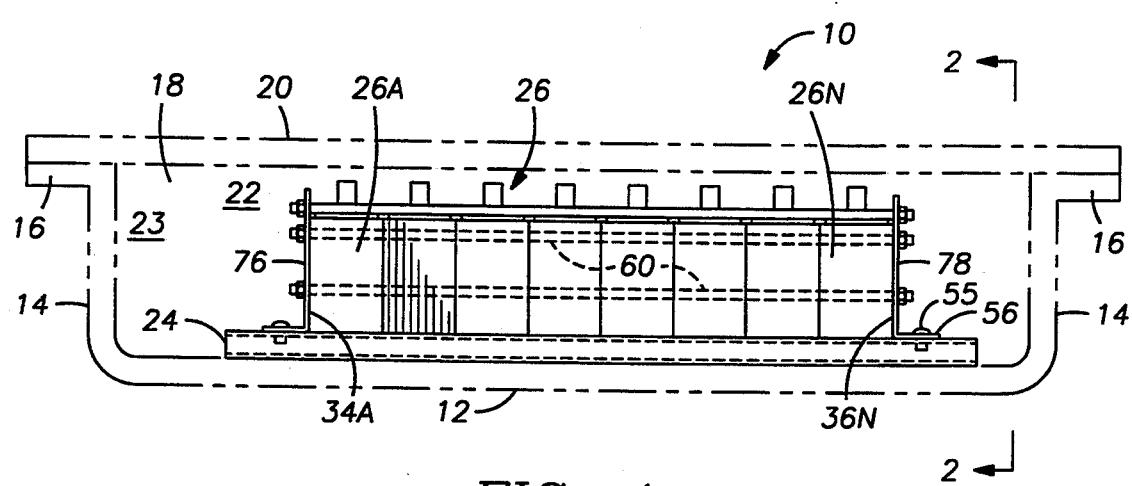
FIG. 1 is a cross-sectional elevation view of an explosion proof panelboard enclosure containing a plurality of circuit breakers with the force absorbing plates of the present invention.

Referring initially to FIG. 1, there is shown a conventional box-like panelboard enclosure 10 which is preferably made of cast aluminum. Enclosure 10 includes a back panel 12 having projecting side and end members 14 terminating in an external flange 16. Enclosure 10 is accessed through open end 18. A removable cover 20 is provided to close access opening 18, thereby forming an internal chamber 22 and completing the explosion-proof enclosure 10. A standard mounting bracket 24 is disposed along the longitudinal length of back panel 12 and a plurality of circuit breakers 26 are mounted on mounting bracket 24.

Figure 2:
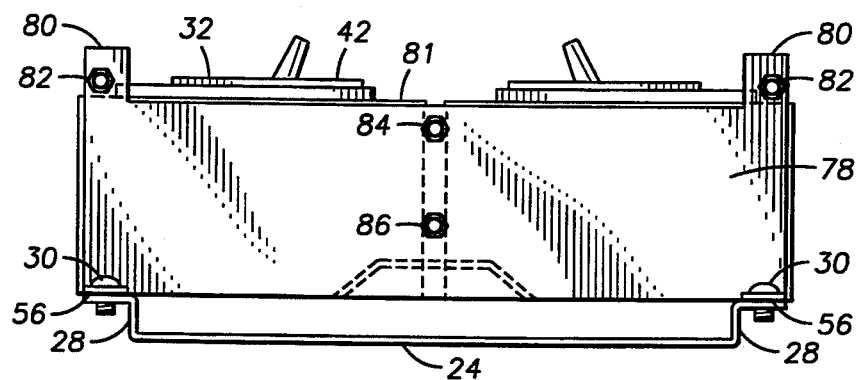
FIG. 2 is an end view at plane 2—2 of FIG. 1 of a plurality of circuit breakers with the force absorbing plates of the present invention.

Referring now to FIG. 2, the mounting bracket 24 is a substantially flat, planar plate having two longitudinal extending mounting flanges 28. The mounting bracket 24 may be attached to the back panel 12, shown in FIG. 1, of the panelboard enclosure 10 by various means well known in the art. Mounting flanges 28 include mounting holes (not shown) to receive mounting bolts 30.

Figure 3:
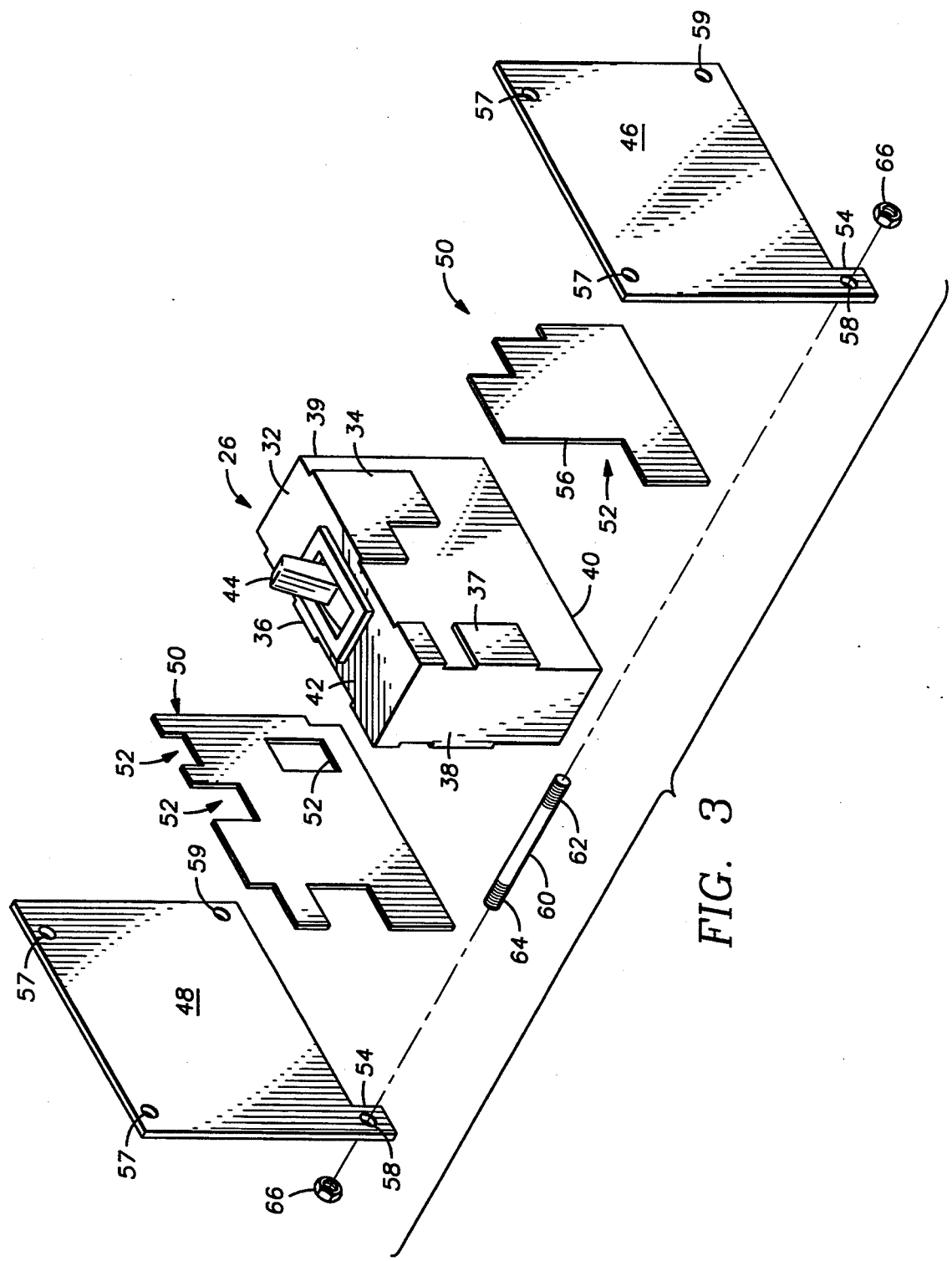
FIG. 3 is an exploded perspective view of the force absorbing plates mounted on a single circuit breaker.

Referring now to FIG. 3, there is shown a conventional circuit breaker 26 to be housed within panelboard enclosure 10. A conventional circuit breaker includes a plastic housing 32, having two side panels 34, 36, front and back end panels 38, 39, a bottom panel 40 and a top switch panel 42. The topography of the surfaces of side panels 34, 36 is uneven with certain portions being raised such as at 37. Protruding through an aperture in the switch panel 42 is a circuit breaker re-set switch 44. The circuit breaker housing 32 is not hermetically sealed, therefore gas can enter the interior of the circuit breaker housing 32.

The explosion absorbing structure of the present invention includes a pair of flat, steel absorbing plates 46, 48 substantially rectangular in shape, and adapted for being located against the side panels 34, 36 of circuit breaker 26. Optional filler plates 50 may be positioned between side panels 34, 36, and absorbing plates 46, 48. Filler plates 50 are preferably substantially flat fiber material which include cut-outs and notches 52 that correspond and conform to the contour and topography of the surfaces of side panels 34, 36. Plates 50 fill the recesses in the side panels 34, 36 to prevent combustible gas from accumulating between either adjacent circuit breakers 26 or circuit breaker housing 32 and force absorbing plates 46, 48.

Each absorbing plate 46, 48 includes a corner having at least one extending tab 54. Four clamping holes are provided in plates 46, 48, two holes 57 in the top two corners, a hole 58 in tab 54, and an offset hole 59 in the lower corner opposite tab 54. Holes 57 are located above the surface of top switch panel 42 and offset hole 59 is located adjacent back end panel 39. Tab 54 with hole 58 is disposed below bottom panel 40. A plurality of straight steel absorbing rods 60, preferably circular in cross-section, have threaded ends 62, 64 which are received through clamping holes 57, 58 and 59. Each threaded end 62, 64 of each absorbing rod 60 threadingly engages a clamping nut 66.

Figure 4:
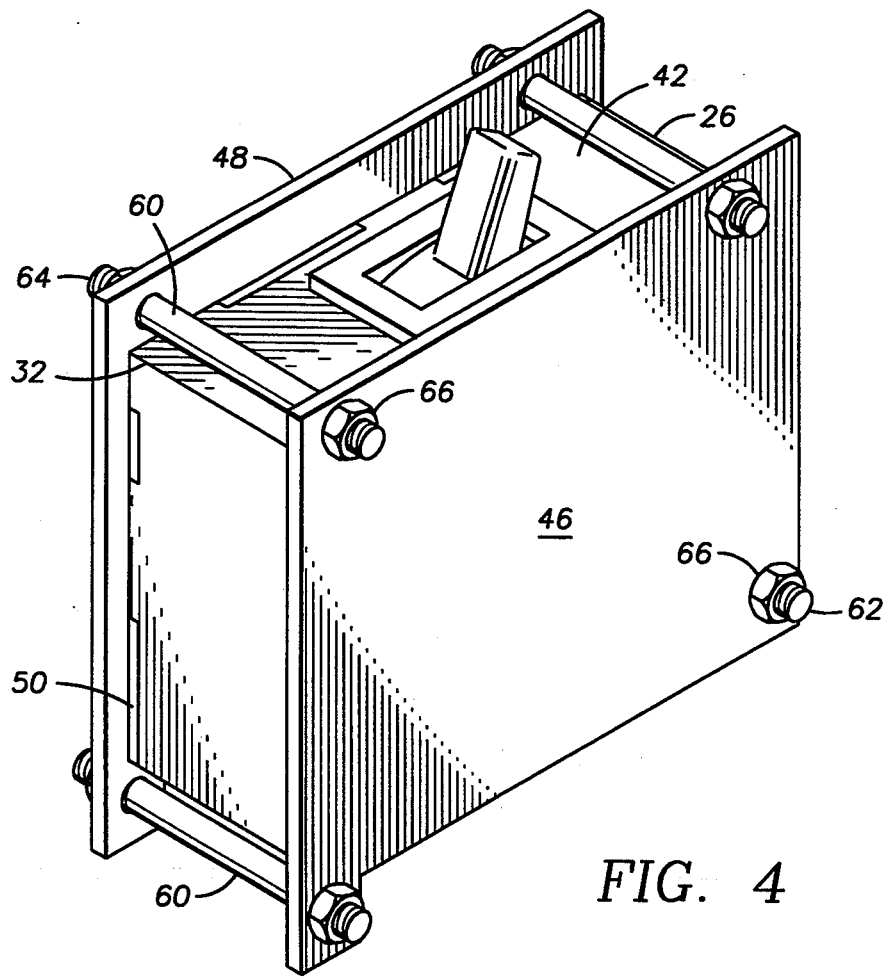
FIG. 4 is a perspective view of the force absorbing plates assembled on a single circuit breaker.

Referring now to FIGS. 3 and 4, during assembly, filler plates 50, which are optional, may be placed against each of the side panels 34, 36 of circuit breaker housing 32. Where, as shown, only one circuit breaker 26 is used, absorbing plate 46 is placed against side panel 34 and absorbing plate 48 is placed against side panel 36 of the circuit breaker housing 32. Optional filler plate 50 is located between side panels 34, 36 and absorbing plates 46, 48. The threaded ends 62, 64 of absorbing rods 60 are then inserted through the aligned clamping holes 57, 58, and 59 in the absorbing plates 46, 48, with absorbing rods 60 extending between absorbing plates 46, 48. Clamping nuts 66 are threaded onto the threaded ends 62, 64 of absorbing rods 60 to tightly compress the housing 32 of circuit breaker 26. The two rods passing through clamping holes 57 extend over the surface of top panel 42. Rod 60 passing through hole 59 extends across the surface of back end panel 39, and rod 60 passing through hole 58 in tab 54 extends parallel and adjacent to mounting bracket 24, shown in FIG. 1. The positioning of holes 58 and 59 allows plates 46, 48 to rest on bracket 24 so that plates 46, 48 can completely cover the surface of side panels 34, 36. The generally square plates 46, 48 may extend above top panel 42 to also protect switch 44. Where plates 46, 48 are mounted to only one circuit breaker 26, it is unnecessary to affix plates 46, 48 to mounting bracket 24.

Figure 5:
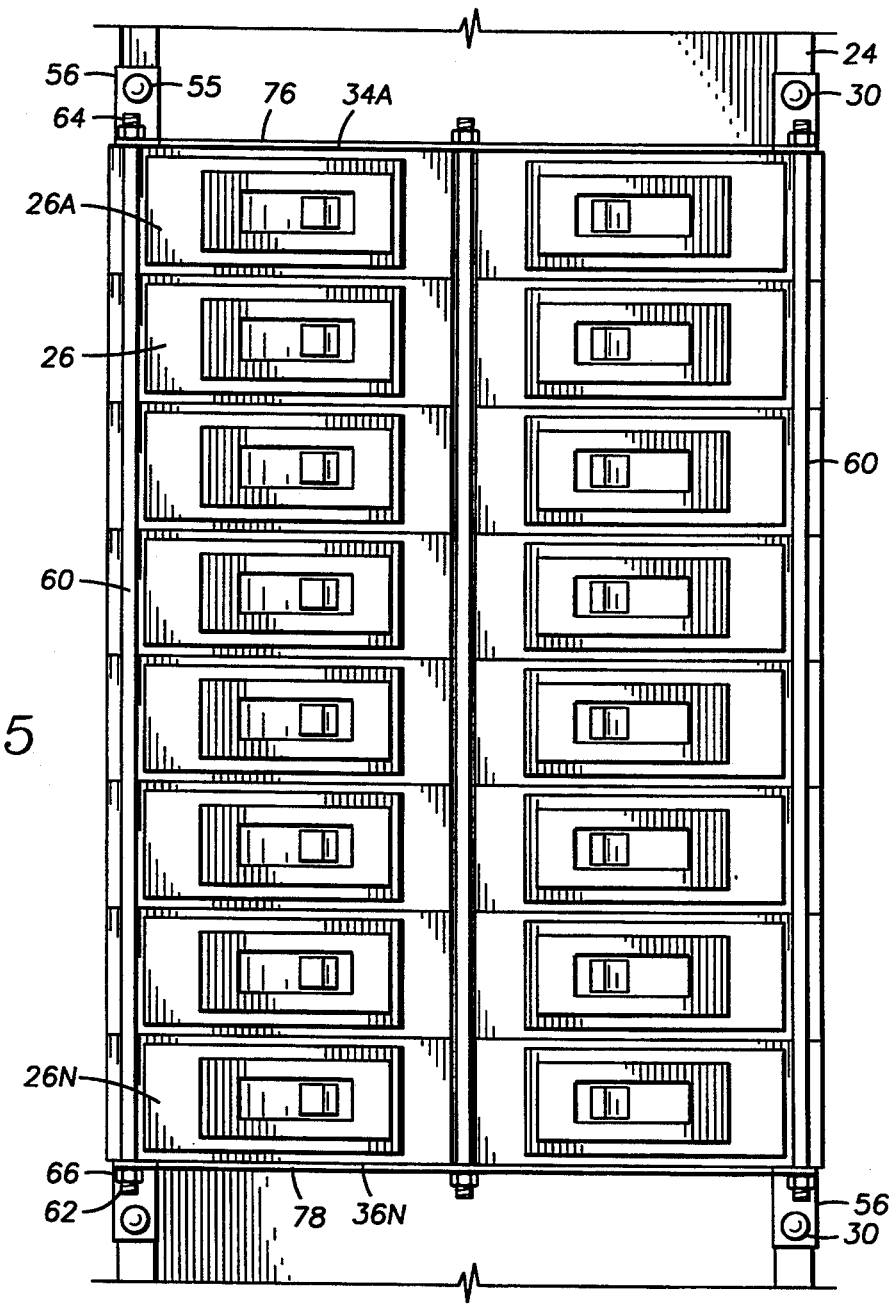
FIG. 5 is a plan view of a plurality of circuit breakers with the force absorbing plates of the present invention mounted within a panelboard enclosure.

Referring now to FIGS. 1, 2 and 5, there is shown the present invention mounted around two parallel rows of a plurality of circuit breakers 26a through 26n disposed within panel 10. An alternative embodiment of the explosion absorbing structure of the present invention is shown and includes a pair of flat, steel absorbing plates 76, 78 substantially rectangular in shape, and adapted for being located against the side panels 34a, 36n of the end circuit breakers 26a, 26n, respectively, in each of the two rows of a plurality of circuit breakers 26a to 26n. Optional filler plates 50, shown in FIG. 3, may be located between adjacent side panels 34, 36 of adjacent circuit breakers 26. Plates 50 fill the recesses in the side panels 34, 36 to prevent combustible gas from accumulating between either adjacent circuit breakers 26 or circuit breaker housing 32 and force absorbing plates 76, 78.

Each absorbing plate 76, 78 includes two mounting flanges 56 (best seen in FIG. 1) which extend perpendicular to the planar surfaces of plates 76, 78 and contain a mounting hole 55. Each absorbing plate 76, 78 includes two corners having at least one extending tab 80 opposite mounting flanges 56 creating a notch at the upper edge of plates 76, 78. The upper edge is generally at a level even with the top switch panels 42 of circuit breakers 26. Thus, plates 76, 78 completely cover outside side panels 34a, 36n. Four clamping holes are provided in plates 76, 78, two holes 82 in tabs 80 and upper and lower holes 84, 86 in the center of plates 76, 78. Holes 82 are located above the surface of top panel 42 and center holes 84, 86 are located between the adjacent rows of circuit breakers 26a to 26n. A plurality of straight steel absorbing rods 60 have threaded ends 62, 64 which are received through clamping holes 82, 84, 86. Each threaded end 62, 64 of each absorbing rod 60 threadingly engages a clamping nut 66.

Referring now to FIGS. 2 and 5, during assembly, a plurality of circuit breakers 26a to 26n are mounted on bracket 24 and arranged in two rows with each circuit breaker 26 having its side panels 34, 36 adjacent to side panels 34, 36 of adjacent circuit breakers 26. Optional filler plates 50, shown in FIG. 3, may be located between adjacent side panels 34, 36. An absorbing plate 76, 78 is placed on each of the outside side panels 34a, 36n of the end circuit breakers 26a, 26n located on the ends of the rows of circuit breakers 26. Optional filler plate 50 may be located between a side panel 34, 36 and the absorbing plate 76, 78. The threaded ends 62, 64 of absorbing rods 60 are then inserted through the aligned clamping holes 82, 84, 86 in the absorbing plates 76, 78, with absorbing rods 60 extending beyond absorbing plates 76, 78. Clamping nuts 66 are threaded onto the threaded ends 62, 64 of absorbing rods 60 to tightly compress the housing 32 of each of the circuit breakers 26a through 26n. The two rods passing through clamping holes 82 extend over the surface of top panel 42. Rods 60 passing through holes 84, 86 extend between adjacent rows of circuit breakers 26. The completed apparatus is then attached to mounting bracket 24 by installing mounting bolt 30 through mounting hole 55 in mounting flange 56 of absorbing plates 76, 78.

Referring again to FIG. 1, assume the ignition of highly compressible gases, such as hydrogen, at one end 23 of chamber 22. When the hydrogen is ignited, an explosive wave front is created which travels throughout the enclosure 10 compressing the gas in front of the wave. Compressed gas is many times more explosive than at ambient pressure. Without the present invention, the hydrogen gas is compressed inside circuit breaker housings 32, seen best in FIG. 3. This compressed gas inside circuit breaker 26 is confined and when ignited blows up and destroys circuit breaker 26 and continues and perpetuates the pressure piling to other adjacent circuit breakers.

The force absorbing plates 76, 78 of the present invention are disposed on the side panels 34a, 36n of end circuit breakers 26a, 26n. When the highly compressed gas inside chamber 22 is ignited at 23, the stress from the explosion is translated to absorbing plates 76, 78 and rods 60. The absorbing apparatus insures the integrity of circuit breakers 26, thus confining the high pressure explosion inside panel 10.

Explosions in an empty panelboard enclosure 10 result in a hydrostatic pressure inside chamber 22 of approximately 70 pounds per square inch (psi). When a circuit breaker 26 contained in panelboard enclosure 10 is destroyed, as a result of pressure piling, the hydrostatic pressure increases to approximately 280 psi. With the force absorbing apparatus of the present invention, the hydrostatic pressure is not increased above that of an empty enclosure. Because panelboard 10 must be designed to withstand explosions four times the hydrostatic pressure, the construction costs of panelboard enclosure 10 are reduced.

As described herein, the present invention provides force absorbing plates 46, 48 or 76, 78 and a means of compressionally attaching absorbing plates 46, 48 or 76, 78 to one or more circuit breakers 26. While the apparatus of the present invention has been described by reference to its preferred embodiment, it will be understood that other various embodiments can be made by one skilled in the art without departing from the spirit of the invention.

What is claimed is:

1. An explosion-proof panelboard enclosure having an explosion-proof compartment, comprising:
   a mounting bracket disposed within the compartment and affixed to the enclosure;
   a plurality of circuit breakers disposed within the compartment, each circuit breaker having two side panels;
   said plurality of circuit breakers forming at least one row of circuit breakers having two outside circuit breakers on each end of said row, said outside circuit breakers having an outside end panel;
   at least first and second plates mounted on said bracket, said first plate being disposed adjacent said outside end panel of one said outside circuit breakers and said second plate being disposed adjacent said outside end panel of said other outside circuit breaker; and
   means compressing said plurality of circuit breakers between said first and second plates.

2. The enclosure of claim 1 wherein said plates cover said outside end panels.

3. The explosion-proof panelboard enclosure of claim 1 further including filler plates disposed between adjacent circuit breakers.

4. The enclosure of claim 7 wherein said means includes bolts extending between said plates for drawing said plurality of circuit breakers together.

5. The explosion-proof panelboard enclosure of claim 1 further including at least one filler plate disposed between said first plate and said outside end panel of one said outside circuit breaker.

6. An explosion absorbing apparatus for an explosion-proof panelboard enclosure, comprising:

a plurality of circuit breakers disposed within said enclosure and affixed to said enclosure;

said plurality of circuit breakers forming at least one row of circuit breakers having a first outside circuit breaker on one end of said row and a second outside circuit breaker on the other end of said row, said outside circuit breakers each having an outside end panel;

at least first and second force absorbing plates, said first plate being disposed adjacent said outside end panel of said first outside circuit breaker and said second plate being disposed adjacent said outside end panel of said second outside circuit breaker;

said force absorbing plates being constructed Of any material capable of absorbing a portion of the force generated by an explosion in the panelboard enclosure; and at least one fastener member connecting said first and second plates and compressing said plurality of circuit breakers between said first and second plates.

7. An explosion absorbing apparatus for an explosion-proof panelboard enclosure, comprising:

a mounting bracket attached to said enclosure:

a plurality of circuit breakers disposed within said enclosure and affixed to said enclosure;

said plurality of circuit breakers forming at least one row of circuit breakers having a first outside circuit breaker on one end of said row and a second outside circuit breaker on the other end of said row, said outside circuit breakers each having an outside end panel;

at least first and second force absorbing plates mounted on said mounting bracket, said first plate being disposed adjacent said outside end panel of said first outside circuit breaker and said second plate being disposed adjacent said outside end panel of said second outside circuit breaker: and at least one fastener member connecting said first and second plates and compressing said plurality of circuit breakers between said first and second plates.

8. The explosion absorbing apparatus of claim 7 further including at least one filler plate disposed between adjacent circuit breakers.

9. The explosion absorbing apparatus of claim 7 wherein said force absorbing plates are constructed of any material capable of absorbing the force generated by an explosion in the panelboard enclosure.

10. The explosion absorbing apparatus of claim 7 wherein said absorbing plates are made of steel.

11. The explosion absorbing apparatus of claim 7 wherein said at least one fastener member comprises a rod and clamping nuts.

12. The explosion absorbing apparatus of claim 11 wherein said absorbing plates each have at least one hole receiving said rod.

13. The explosion absorbing apparatus of claim 11 wherein said rod has threaded ends threadingly engaging said clamping nuts.

14. The explosion absorbing apparatus of claim 12 wherein said rod has threaded ends threadingly engaging said clamping nuts.

15. The explosion absorbing apparatus of claim 11 wherein said rod is made of steel.

16. An explosion absorbing apparatus for an explosion-proof panelboard enclosure, comprising:

a plurality of circuit breakers disposed within said enclosure and affixed to said enclosure;

said plurality of circuit breakers forming at least one row of circuit breakers having a first outside circuit breaker on one end of said row and a second outside circuit breaker on the other end of said row, said outside circuit breakers each having an outside end panel;

at least first and second force absorbing plates, said first plate being disposed adjacent said outside end panel of said first outside circuit breaker and said second plate being disposed adjacent said outside end panel of said second outside circuit breaker;

at least one fastener member connecting said first and second plates and compressing said plurality of circuit breakers between said first and second plates; and at least one filler plate disposed between said first plate and said outside end panel of said first outside circuit breaker.

17. An explosion absorbing apparatus for an explosion-proof panelboard enclosure, comprising:

a circuit breaker disposed within said enclosure and affixed to said enclosure;

said circuit breaker having a housing with first and second side panels;

first and second force absorbing plates, said first plate being disposed adjacent said first side panel of said circuit breaker and said second plate being disposed adjacent said second side panel of said circuit breaker;

said force absorbing plates being constructed of any material capable of absorbing a portion of the force generated by an explosion in the panelboard enclosure: and at least one fastener member connecting said first and second plates and compressing said housing of said circuit breaker between said first and second plates.

18. An explosion absorbing apparatus for an explosion-proof panelboard enclosure, comprising:

a mounting blacker attached to said enclosure:

a circuit breaker disposed within said enclosure and affixed to said enclosure;

said circuit breaker having a housing with first and second side panels;

first and second force absorbing plates mounted on said mounting bracket, said first plate being disposed adjacent said first side panel of said circuit breaker and said second plate being disposed adjacent said second side panel of said circuit breaker; and at least one fastener member connecting said first and second plates and compressing said housing of said circuit breaker between said first and second plates.

19. The explosion absorbing apparatus of claim 18 wherein said at least one fastener member comprises a rod and clamping nuts.

20. The explosion absorbing apparatus of claim 19 wherein said absorbing plates each have at least one hole receiving said rod.

21. The explosion absorbing apparatus of claim 19 wherein said rod has threaded ends threadingly engaging said clamping nuts.

22. The explosion absorbing apparatus of claim 20 wherein said rod has threaded ends threadingly engaging said clamping nuts.

23. The explosion absorbing apparatus of claim 18 wherein said absorbing plates are made of steel.

24. The explosion absorbing apparatus of claim 18 wherein said force absorbing plates are constructed of any material capable of absorbing the force generated by an explosion in the panelboard enclosure.

25. The explosion absorbing apparatus of claim 19 wherein said rod is made of steel.

26. An explosion absorbing apparatus for an explosion-proof panelboard enclosure, comprising:
a circuit breaker disposed within said enclosure and affixed to said enclosure;
said circuit breaker having a housing with first and second side panels;
first and second force absorbing plates, said first plate being disposed adjacent said first side panel of said circuit breaker and said second plate being disposed adjacent said second side panel of said circuit breaker;
at least one fastener member connecting said first and second plates and compressing said housing of said circuit breaker between said first and second plates; and at least one filler plate disposed between said first side panel and said first absorbing plate.

27. An explosion absorbing apparatus for an explosion-proof panelboard enclosure, comprising:
a plurality of circuit breakers disposed within said enclosure and affixed to said enclosure;
said plurality of circuit breakers forming at least one row of circuit breakers having a first outside circuit breaker on one end of said row and a second outside circuit breaker on the other end of said row, said outside circuit breakers each having an outside end panel; and
at least first and second force absorbing plates supported by said enclosure, said first plate being disposed adjacent said outside end panel of said first outside circuit breaker and said second plate being disposed adjacent said outside end panel of said second outside circuit breaker: and
said force absorbing plates being constructed of any material capable of absorbing a portion of the force generated by an explosion in the panelboard enclosure.

28. An explosion absorbing apparatus for an explosion-proof panelboard enclosure, comprising;.
a mounting bracket attached to said enclosure;
a plurality of circuit breakers disposed within said enclosure and affixed to said enclosure:
said plurality of circuit breakers forming at least one row of circuit breakers having a first outside circuit breaker on one end of said row and a second outside circuit breaker on the other end of said row, said outside circuit breakers each having an outside end panel: and
at least first and second force absorbing plates mounted on said mounting bracket, said first plate being disposed adjacent said outside end panel of said first outside circuit breaker and said second plate being disposed adjacent said outside end panel of said second outside circuit breaker.

29. The explosion absorbing apparatus of claim 28 further including at least one fastener member connecting said first and second plates and compressing said plurality of circuit breakers between said first and second plates.

30. The explosion absorbing apparatus of claim 29 wherein said at least one fastener member comprises a rod and clamping nuts.

31. The explosion absorbing apparatus of claim 30 wherein said absorbing plates each have at least one hole receiving said rod.

32. The explosion absorbing apparatus of claim 30 wherein said rod has threaded ends threadingly engaging said clamping nuts.

33. The explosion absorbing apparatus of claim 31 wherein said rod has threaded ends threadingly engaging said clamping nuts.

34. The explosion absorbing apparatus of claim 28 wherein said absorbing plates are made of steel.

35. The explosion absorbing apparatus of claim 28 wherein said force absorbing plates are constructed of any material capable of absorbing the force generated by an explosion in the panelboard enclosure.

36. The explosion absorbing apparatus of claim 28 further including at least one filler plate disposed between adjacent circuit breakers.

37. An explosion absorbing apparatus for an explosion-proof panelboard enclosure, comprising;
plurality of circuit breakers disposed within said enclosure and affixed to said enclosure;
said plurality of circuit breakers forming at least one row of circuit breakers having a first outside circuit breaker on one end of said row and a second outside circuit breaker on the other end of said row, said outside circuit breakers each having an outside end panel; and
at least first and second force absorbing plates supported by said enclosure, said first plate being disposed adjacent said outside end panel of said first outside circuit breaker and said second plate being disposed adjacent said outside end panel of said second outside circuit breaker; and
at least one filler plate disposed between said first plate and said outside end panel of said first outside circuit breaker.

* * * * *